Figure 1:
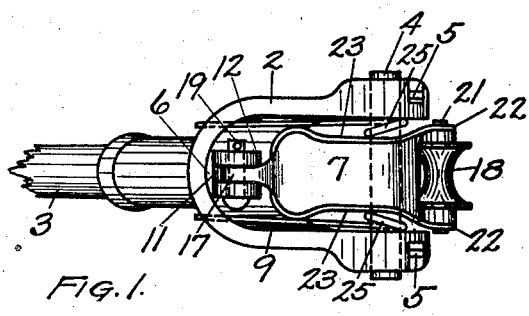

Dec. 21, 1926.

W. F. FREEMAN

TROLLEY SHOE

Filed Nov. 3, 1925

1,611,733

WITNESS:
Robert A. Cecchini.

INVENTOR.
Walter F. Freeman,
BY
Frank A. Cutter,
ATTORNEY.

Patented Dec. 21, 1926.

1,611,733

UNITED STATES PATENT OFFICE.

WALTER F. FREEMAN, OF SPRINGFIELD, MASSACHUSETTS.

TROLLEY SHOE.

Application filed November 3, 1925. Serial No. 66,478.

My invention relates to improvements in trolley shoes, such as are used in place of wheels in the harps of trolley poles, and consists essentially of an oscillatory hanger or holder having a hub adapted to be mounted on the axle of a trolley-pole harp, and provided with a stop member, a contact member or runner, which is the shoe proper, pivotally connected with said holder, and provided with a roller, a supporting spring for said runner, and a stop member extending between said axle and the base of said harp, together with other stop members, and such other parts and members as may be necessary or desirable in order to render the device complete and serviceable in every respect, all as hereinafter set forth.

The primary object of my invention is to produce a trolley shoe with which the cost of collecting the electric current is reduced, wear of the overhead wire and of the sliding contact or runner is materially lessened, and dewiring is prevented.

The reduction in cost is due to the superior conductivity of the sliding contact or runner which functions, in place of a wheel, on the overhead or trolley wire. The decrease in the wear on the trolley wire and runner results from the presence of the supporting spring for said runner, which absorbs much of the vibration, and measurably lessens the force that otherwise would need to be exerted on said runner and transmitted thereby to said wire. In other words, the spring that directly supports the runner, and is independent of the pole springs, acts as a cushion for said runner and between the same and said pole, and prevents the latter from thrusting the former against the trolley wire so forcibly as to produce undue wear of the parts.

By "dewiring" is meant the act of a trolley wheel or shoe in jumping off of the trolley wire. This most frequently occurs with a shoe during the act of backing. The ordinary trolley-shoe runner is almost certain to leave the wire when the car is backed, which necessitates manipulating the pole to return the runner to the wire. This is inconvenient and a waste of time, but is not the only objection, inasmuch as cross and stay wires are liable to be damaged, by the pole and the members carried at the top thereof, during the time the runner is in the air above the trolley wire, and said pole is being carried along in a more approximately vertical position.

The roller, with which the runner in my shoe is equipped, prevents said runner from leaving the wire when backing, and thus is an important factor in the saving of both time, labor, and expense.

Another object is to produce a shoe, of the character described, which is comparatively simple and inexpensive in construction, consists of few parts and those not liable to break or become disabled, is capable of being attached to and connected with any ordinary harp, and in which the runner is readily detachable and attachable, hence can be easily and quickly changed in the event it becomes badly worn, or for any other reason detachment of the old runner and replacement of the same or the substitution therefor of another be necessary or desirable.

Other objects and advantages will appear in the course of the following description.

I attain the objects and secure the advantages of my invention by the means illustrated in the accompanying drawings, in which—

Figure 2:
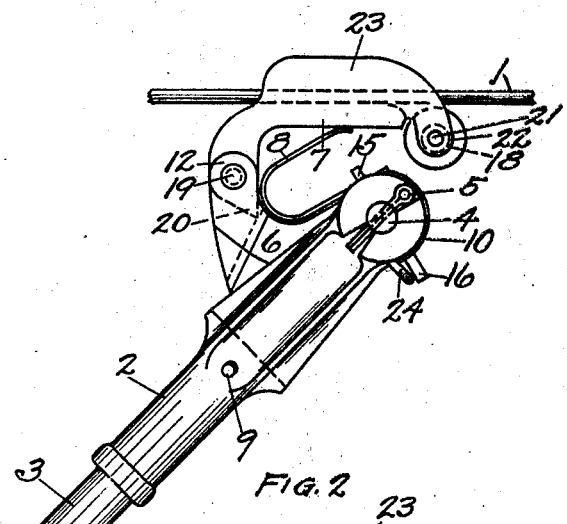
Figure 3:
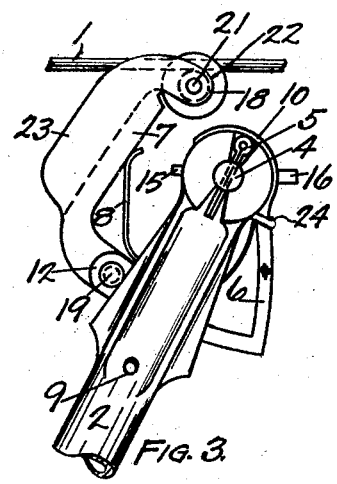
Figure 4:
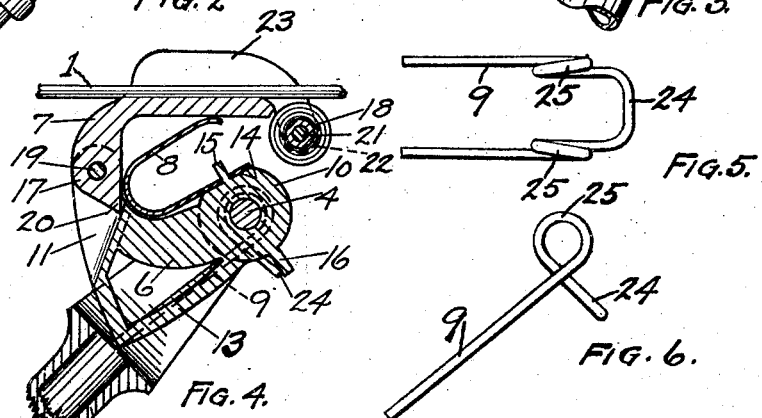
Figure 5:
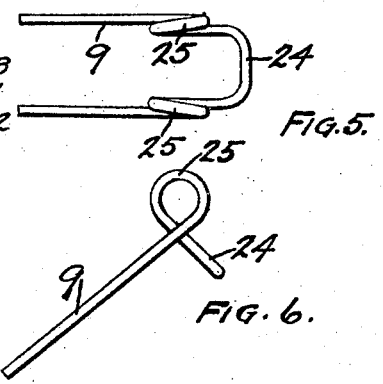
Figure 6:
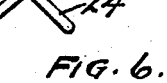

Figure 1 is a top plan of a trolley shoe which embodies a practical form of my invention; Fig. 2, a side elevation of said shoe; Fig. 3, a side elevation of said shoe when in the position which it assumes while backing; Fig. 4, a central, vertical, longitudinal section through the shoe, the same being disposed as in Fig. 2; Fig. 5, a plan of the wire stop member, and, Fig. 6, a side elevation of said member.

Similar reference characters designate similar parts throughout the several views.

In the first two views, and also in Fig. 4, the shoe is disposed as when in the act of moving forward in frictional or sliding contact with an overhead or trolley wire, a short length of such a wire being shown at 1 in Figs. 2, 3, and 4.

This shoe is applicable to an ordinary harp, such as that represented at 2 in the drawings. The harp 2 is mounted on a trolley pole, a fragment of which appears at 3, and said harp is provided with an axle 4, such axle being mounted in the arms of said harp adjacent to their free ends. Split pins 5—5 extend through the projecting terminals of the axle 4 outside of the harp arms, and are received in recesses in said arms, substantially as shown, and thus prevent said axle from becoming displaced endwise and from being rotated. The parts and members thus far described are old and well known.

The trolley shoe itself comprises a holder 6, a roller-provided runner 7, a spring 8, and a stop member 9.

The holder 6 has at its rear or upper end, according to the position of said holder, a hub 10. In the front or bottom end of the holder 6 is a slot 11 the sides of which are extended to form a pair of lugs 12. The holder 6 extends downwardly or forwardly in angular formation as shown, and the rear portion of such part serves as a stop 13. The hub 10 is flattened on the side adjacent to the runner 7, as represented at 14, and extending outwardly from the center of such flattened part is a projection 15. Extending outwardly from the hub 10, on the side opposite to where the projection 15 is located, is a projection or stop 16. The hub 10 is mounted to oscillate on the axle 4.

The runner 7 has at the front or lower end a downwardly- or rearwardly-extending lug 17, and is provided at the opposite end with a roller 18. The lug 17 is received between the lugs 12, and pivotally connected therewith at 19. The lug 17 at the inner end is projected to form a stop 20 which engages the inner wall of the slot 18 between the side walls thereof, when the runner 7 is rocked upwardly on the pivot 19, and thus limits the upward movement of said runner. The roller 18 is mounted on a horizontal axle 21 carried in a pair of arms or lugs 22 that extend downwardly or rearwardly from the rear or upper end of the runner 7. Side pieces or flanges 23—23 extend outwardly from the runner 7, between the lugs 17 and the arms 22, to form with the outer side of said runner a trough for the reception of the overhead wire 1.

The spring 8 is U-shaped and arranged between the hub 10 and the bottom of the runner 7 at a point intermediate of the ends thereof, with the heel of said spring forwardly or downwardly disposed. One terminal of the spring 8 bears on the flat part 14 of the hub 10, and is held in place thereon by the projection 15, to receive which said spring is perforated. The other terminal of the spring 8 is in direct contact with the under side of the runner 7. Normally the spring 8 retains the runner 7 with the stop 20 in contact with the innermost side of the slot 11—see Fig. 4.

The stop member 9 preferably consists of a piece of wire bent on itself, and having formed therein adjacent to the heel (24) thereof a pair of loops 25. The loops 25 are mounted on the axle 4 on opposite sides of the hub 10. The approximately parallel arms of the stop member 9 extend forwardly and downwardly to have their free ends inserted in suitable openings in the base of the harp 2, or to be otherwise engaged with said base. The heel 24 of the stop member 9 is disposed at approximately right-angles to the arms of said member, below and behind the plane of said arms, and is between and in the path of the stops 13 and 16. The movement of the holder 6 on the axle 4 is limited by the stops 13 and 16 and the heel 24. When the holder 6 is swung upwardly on the axle 4, the stop 16 encounters the heel 24 and so limits the movement in that direction, as best shown in Figs. 2 and 4, and, when said holder is swung downwardly on said axle, the stop 13 encounters said heel and so limits the movement in that direction, as shown in Fig. 3. Normally, or when the runner 7 is out of engagement with the trolley wire 1, the holder 6 swings downwardly by gravity until the stop 13 encounters the heel 24.

When the runner 7 is raised into engagement with the wire 1, the roller 18 first encounters said wire, and then said runner, rocking on the axis of said roller, is caused to assume an approximately horizontal position beneath and in contact with said wire. In assuming its full sliding contact with the wire 1, the runner 7 removes the roller 18 from said wire, so that said roller is entirely clear of the same. At this time the holder 6 is caused to swing upwardly on the axle 4, until the stop 16 encounters the heel 24. The runner 7 is now in normal position for forward movement in contact with the wire 1. The spring 8 permits the runner 7 to rock on the pivot 19 toward the hub 10, and thus absorbs a considerable amount of the vibration incident to the travel of the runner in contact with the wire, and relieves the parts of some of the force of the trolley-pole springs. This construction, and the combination which includes the spring 8, makes it possible to set the trolley-pole springs for several pounds less pressure than is ordinarily required, thus cutting down the force of the upward thrust of the pole 3.

In backing up, the holder 6 is caused to swing downwardly on the axle 4 until the stop 13 encounters the heel 24. The holder 6 carries with it the runner 7. The runner 7 in swinging downwardly with the holder 6 rocks on the rear end of the wire 1 and thrusts the roller 18 upwardly into contact with said wire. The runner 7 including its rear end is now entirely clear of the trolley wire, only the roller 18 being in engagement with said wire. The roller 18 revolves freely on the axle 21 beneath and in contact with the wire 1, during the act of backing, and prevents the shoe from becoming disengaged from said wire, as the ordinary shoe is liable to do. At this time the trolley pole 3 assumes a more nearly erect position, and the force exerted on the runner 7 to retain the roller 18 in contact with the wire 1 serves to retain the stop 13 in engagement with the heel 24.

As soon as the trolley shoe is moved forward again, the runner 7, fulcruming with the roller 18 on the wire 1, rocks upwardly into an approximately horizontal position again, and carries with it the holder 6. At this time the stop 13 is carried away from the heel 24 and the stop 16 is carried into engagement with said heel.

Although the stop member 9 is held securely in place by the loops 25 on the axle 4 and the free terminals in engagement with the base of the harp 2, the heel 24 naturally yields a little under the impact thereon of either the stop 13 or the stop 16, wherefore undue shock and jar are eliminated at such times as the holder 6 with its runner changes from one extreme position to the other.

The stop member 9, constructed and mounted as it is, furnishes an additional path and an excellent conductor for the electric current from the axle 4 to points on the harp 2 adjacent to the pole 3, and thus adds to the conductivity of the parts and members at the top of said pole.

More or less change in the shape, size, construction, and arrangement of some or all of the parts of this trolley shoe may be made, without departing from the spirit of my invention or exceeding the scope of what is claimed.

What I claim as my invention, and desire to secure by Letters Patent, is—

1. A trolley shoe comprising a member pivotally connected with a trolley harp, and a flanged runner pivotally connected with said member for normal running engagement with the overhead wire, and provided with a roller adapted to engage said wire during the act of backing, the construction and arrangement of parts being such that the runner flanges engage said wire and assist in retaining said roller in engagement therewith during said act of backing.

2. A trolley shoe comprising a runner provided with a roller adapted to engage the overhead wire during the act of backing, a member adapted to be pivotally connected with a trolley harp, and a pivotal connection between said runner and said member.

3. A trolley shoe comprising a runner provided with a roller adapted to engage the overhead wire during the act of backing, a member adapted to be pivotally connected with a trolley harp, a pivotal connection between said runner and said member, and a spring interposed between said member and said runner.

4. A trolley shoe comprising a runner provided with a roller adapted to engage the overhead wire during the act of backing, a member adapted to be pivotally connected with a trolley harp, a pivotal connection between said runner and said member, a spring interposed between said member and said runner, and means to limit the movement of said runner under the influence of said spring.

5. A trolley shoe comprising a runner provided with a roller adapted to engage the overhead wire during the act of backing, a member adapted to be pivotally connected with a trolley harp, a pivotal connection between said runner and said member, and means to limit the movement of said member.

6. A trolley shoe comprising a runner provided with a roller adapted to engage the overhead wire during the act of backing, a member adapted to be pivotally connected with a trolley harp, a pivotal connection between said runner and said member, a spring interposed between said member and said runner, and means to limit the movement of said member.

7. A trolley shoe comprising a runner provided with a roller adapted to engage the overhead wire during the act of backing, a member adapted to be pivotally connected with a trolley harp, a pivotal connection between said runner and said member, a spring interposed between said member and said runner, means to limit the movement of said runner under the influence of said spring, and means to limit the movement of said member.

8. The combination, in a trolley shoe, with a trolley harp and its axle, of a holder having a hub mounted on said axle, and provided with stop members, a runner supported by said holder, and a yielding member attached to said harp and having a projecting part that forms a stop in the path of said first-named stop members.

9. The combination, in a trolley shoe, with a trolley harp and its axle, of a holder having a hub mounted on said axle, and provided with stops, a runner supported by said holder, and a stop member having a part in the path of said stops, said stop member also being mounted on said axle, and having terminals which are engaged with said harp.

10. The combination, in a trolley shoe, with a trolley harp and its axle, of a holder having a hub mounted on said axle, and provided with stops, a runner supported by said holder, and a stop member comprising a bent wire looped over said axle and having its free terminals engaged with said harp, with the heel of said member in the path of said stops.

11. The combination, in a trolley shoe, with a trolley harp and its axle, of a holder mounted on said axle, a runner pivotally connected with said holder, and having a part to engage said holder and limit the movement of said runner on its pivot, and a spring arranged normally to retain said runner in position to cause its stop part to be in engagement with said holder.

12. The combination, in a trolley shoe, with a trolley harp and its axle, of a holder mounted on said axle, a runner pivotally connected with said holder, and having a part to engage said holder and limit the movement of said runner on its pivot, and a roller carried by said runner and adapted to engage the overhead wire during the act of backing.

13. The combination, in a trolley shoe, with a trolley harp and its axle, of a holder mounted on said axle, a runner pivotally connected with said holder, and having a part to engage said holder and limit the movement of said runner on its pivot, a roller carried by said runner and adapted to engage the overhead wire during the act of backing, and a spring arranged normally to retain said runner with its stop part in engagement with said holder.

14. The combination, in a trolley shoe, with a trolley harp and its axle, of a holder mounted on said axle, a runner pivotally connected at one terminal with said holder, and having a part to engage said holder to limit the movement in one direction of said runner on its pivot, a roller supported by said runner at the other terminal, and a spring arranged normally to retain said runner in position with its stop part in engagement with said holder.

15. The combination, in a trolley shoe, with a trolley harp and its axle, of a holder having a slot in one terminal and a hub at the other terminal mounted on said axle, said hub being provided with positioning means for a spring, a runner having a lug received in said slot and pivotally connected with the sides thereof, with a portion of said lug adapted to engage the innermost side of said slot to limit the movement of said runner on its pivot in one direction, a roller carried by said runner at the opposite terminal, and a spring between said hub and said runner and held in place by said positioning means.

16. The combination, in a trolley shoe, with a trolley harp and its axle, of a holder having a slot in one terminal and a hub at the other terminal, with a part between that forms a stop, said hub being mounted on said axle, and provided on approximately opposite sides with positioning means for a spring and a stop, a runner having a lug received in said slot and pivotally connected with the sides thereof, with a portion of said lug adapted to engage the innermost side of said slot to limit the movement of said runner on its pivot in one direction, a roller carried by said runner at the opposite terminal, a spring between said hub and said runner and held in place by said positioning means, and a wire looped over said axle and engaged with said harp, and having a part in the path of said first-named stops to limit the movement of said holder on said axle.

WALTER F. FREEMAN.